July 15, 1941.  G. W. FILES  2,248,976
RADIOGRAPHIC UNIT
Filed Nov. 17, 1939
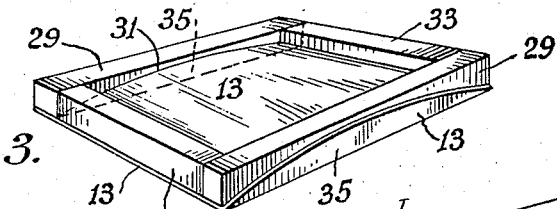
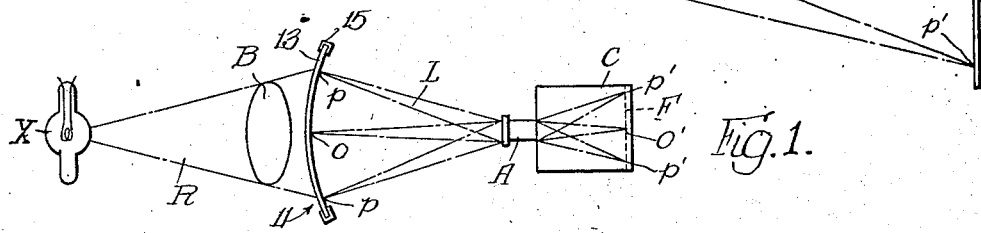
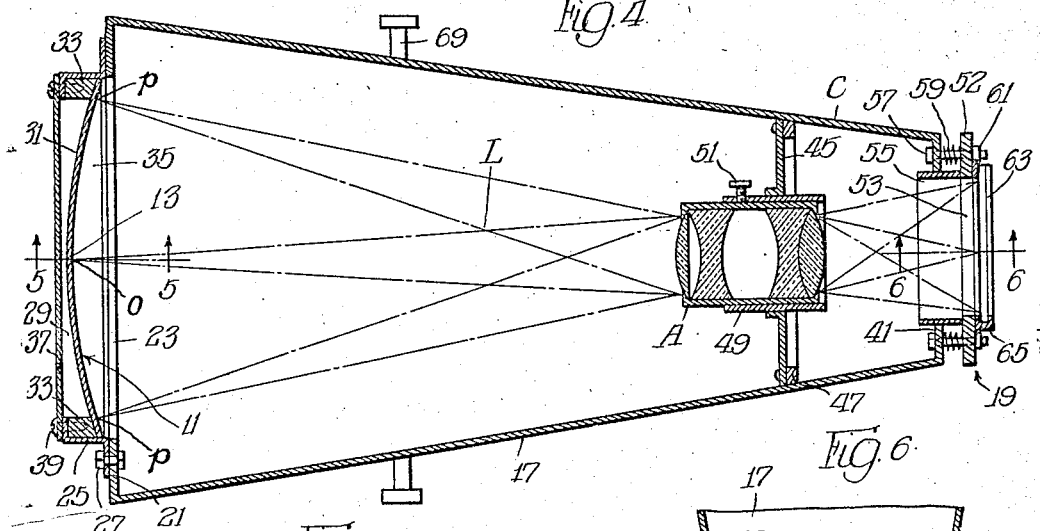
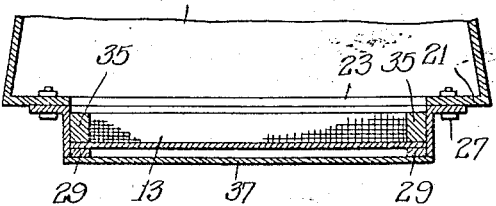
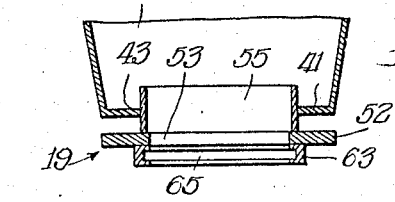
INVENTOR.
Glenn W. Files,
BY Junius F. Cook, Jr.
ATTORNEY.

Patented July 15, 1941

2,248,976

UNITED STATES PATENT OFFICE 2,248,976

RADIOGRAPHIC UNIT

Glenn W. Files, Oak Park, Ill., assignor to General Electric X-Ray Corporation, Chicago, Ill., a corporation of New York Application November 17, 1939, Serial No. 304,999

3 Claims. (Cl. 250—65)

My invention relates in general to photography and has more particular reference to photofluorography, that is to say, the making of photographic reproductions of images formed on fluoroscopic screens under the influence of X-rays.

In making photofluorographic pictures on light sensitive film, it is ordinarily essential to utilize a so-called "fast" lens and to utilize the entire lens area in order to obtain an impression on the light sensitive film, since the fluoroscopic image to be photographed emits a relatively small amount of light. Consequently, at least two aberations affecting sharpness of detail in the resulting picture become apparent. These are coma, or spherical aberation of the oblique rays passing the lens, and curvature of the field, that is to say, failure of the focal points of the oblique and axial rays to fall in a common plane.

In order to conserve space, it is desirable, if not essential for practical reasons, to utilize a short lens-image distance of the order of six inches in arranging equipment for the photography of screened pictures. This necessity tends to increase the aberational effect heretofore noted, and although it may be possible, in theory, to rectify aberational effects by increasing the lens-image distance or by "stopping down" the lens aperture, such expedients are not feasible, since lenses of the character required, having focal length sufficiently great to eliminate aberation, would be excessively costly were it possible to construct the same. Furthermore, the use of such lenses of focal length sufficient to eliminate aberation would require camera apparatus of prohibitive size. It is, therefore, an important object of the present invention to provide for the use of "fast" lenses of relatively short focal length, in practical fashion, for the photography of screened images of relatively weak light intensity, by utilizing the lens at its maximum light transmitting efficiency, while eliminating distortional effects.

An important object of my present invention is to provide for making photographs of images formed on screens substantially without aberation due to coma or curvature of the field.

Another important object resides in providing for the elimination of coma and spherical aberation in photofluorography.

Still another important object resides in the elimination of coma and field curvature in the photography of images generated by X-rays on fluoroscopic screens.

Another important object resides in providing photofluorographic equipment for the production of coma and curvature free pictures, on flat light-sensitive plates, of images generated by X-rays on fluoroscopic screens; a further object being to provide a fluoroscopic screen for the purpose mentioned; a still further object being, for diagnostic purposes, to provide a fluoroscopic screen having cylindrical curvature.

These and numerous other objects, advantages, and inherent functions of the invention will become apparent as the invention is more fully understood from the following description, which, taken in connection with the accompanying drawing, discloses a preferred embodiment of the invention.

Referring to the drawing:

Figure 1 is a diagrammatic view of fluoroscopic equipment, including a source of X-ray, a fluoroscopic screen in position to be influenced by X-rays from the source, and a camera positioned to photograph images generated on the screen in accordance with my present invention;

Figure 2 is an enlarged view of the lens and the light sensitive film, in the camera shown in Figure 1;

Figure 3 is a perspective view, showing the arrangement of parts forming a curved screen, in accordance with my present invention, for the photography of screen images;

Figure 4 is a sectional view of camera mechanism embodying a fluoroscopic screen, in accordance with my present invention; and Figures 5 and 6 are sectional views taken substantially along the lines 5—5 and 6—6 in Figure 4.

Where an image to be photographed is generated on a flat screen by means of a camera embodying a lens, light rays originating on the screen and passing through the lens come to focus in a curved plane behind the lens and therefore cannot all be sharply focused upon light-sensitive material supported in a flat plane behind the lens. The foregoing consideration gives rise to what is known as spherical aberation and curvature of the field.

I propose to rectify this condition by providing a curved screen structure 11, the concave face of the screen facing the camera lens A, and the curvature being of degree such that the light rays L, emanating from remote points in the screen 11 and passing through the lens assembly A, become focused in the flat plane of the film F, thus eliminating coma and spherical aberation. Obviously, my invention contemplates a screen 11, curved spherically, so that light rays emanating from all points on the screen may become focused upon the flat light-sensitive film F. For practical purposes, however, the curved screen may be formed as a rectangular screen, curved cylindrically, that is to say, in one direction only, since for diagnostic purposes, it is ordinarily sufficient to eliminate aberation along one axis only of the screen in order to produce a sharply focused zone in the resulting picture. By curving the screen in one direction only, I am able to obtain photographs sharply focused throughout a medial zone extending in the ends of the picture as well as in the central portions thereof, the lateral sides only showing aberational effects. For diagnostic purposes, it is usually, if not invariably, sufficient to produce aberation-free pictures extending to the edge of the picture at two of the opposite ends thereof only, although it is quite necessary, if not essential, particularly, for example, in the examination of the apices of the lungs, to be able to obtain pictures free from aberation in at least an edge portion of the picture where the image of the apex of a lung may be obtained, it being difficult, if not impractical, because of the configuration of the human body, to obtain pictures in which the image of the apices of the lung are centered in the picture.

The screen may comprise a panel or plate 13 of suitable material which, when the invention is applied to fluoroscopic work, may be any known material adapted to fluoresce under the influence of X-rays. The panel or plate 13 is preferably curved uniformly between a pair of its opposed edges, preferably in cylindrical fashion, and, as shown in Figure 3, the panel may be mounted and supported in curved position in any suitable fashion, as on a frame 15, for rigidifying and maintaining the panel 13 in the desired curved configuration. The frame 15 may comprise binding strips applied at the marginal edges of the panel 13, and a pair of the frame forming binding strips at opposite ends of the panel may be formed with handles to facilitate manipulation of the screen. The frame also may be formed with means to facilitate the mounting of the screen, as on a support pedestal.

The screen 13 may, of course, be formed as a unit entirely separate from the camera C, providing that no light other than that emanating from the screen be permitted to reach the lens A and be transmitted thence to the sensitive film F. I prefer, however, to construct the camera, including the lens A, as a unit with the screen 11 and to enclose the screen and the lens as an integral part of the camera, thereby permitting the same to be used without danger of fogging the film due to the penetration of extraneous light to the lens. To this end, the lens A, as shown in Figure 4, is mounted within a hollow sleeve-like and light tight box 17, at one end of which is mounted the curved screen 13, the other end of the box being fitted with a light tight support 19 in which the film, in a suitable cassette, may be removably supported in position for exposure.

The sleeve-like box 17 may be constructed of any suitable material, such as wood, and is tapered from its larger end on which the screen 13 is mounted towards its film-carrying end. The screen-carrying end of the box may be formed with an inwardly disposed flange 21, defining an opening 23 upon which may be secured a support frame 25 for the screen 13, the frame being anchored in place at the opening 23 by any suitable fastening means, such as the bolts 27 which engage the frame and the flange 21 to secure the parts together.

The frame 25 preferably comprises a sheet metal structure of rectangular configuration within which is arranged, along the opposite sides of the frame, a pair of screen mounting blocks 29, the forward edges of which are straight, and the rear edges 31 of which are curved in conformity with the curvature of the screen 13. A pair of mounting blocks 33 extend within and along the opposite sides of the frame in order to hold the blocks 29 in place within the frame. The screen 13 is secured upon the curved edges 31 of the blocks 29 by means of holding blocks 35, which are secured to the blocks 27 by suitable fasteners which penetrate the edges of the screen 13 and hold the blocks 29 and 35 together on opposite sides of the screen.

The screen and its holding blocks thus are assembled in the frame 25 and covered by a finishing panel 37, which is held upon the frame by fastening screws 39 which penetrate the edges of the panel 37 and the inturned flanged end of the frame 25, said fastening screws taking into and seating in the screen mounting blocks 29 and 33 in order to hold the same and the screen in place in the frame 25.

The film-carrying end of the box 17 is formed with an inturned flange 41 defining an opening 43, and the lens assembly A is supported within the box on a panel 45 which is anchored in place, as by means of the molding 47. The panel 45 has a central opening, carrying a sleeve 49 secured therein, the sleeve serving to receive and support the lens assembly, which may be clamped in adjusted position in the sleeve by means of the set screw 51. The film holder 19 comprises a panel 52 formed with a central opening 53, and flange means 55 extending from the panel around the opening 53 in position to snugly and slidingly fit within the opening 43 of the box, the edges defining said opening 43 being preferably fitted with felt to provide a light tight joint with the sleeve 55. The edges of the panel 52, outwardly of the opening 53, and the flange 41 are provided with aligned openings for the reception of bolts 57 extending through the flange 43 and provided with the springs 59. The threaded ends of the bolts 57 are adapted to penetrate through the openings in the panel 52 as the same is assembled in the opening 43, the panel 52 being held in place by nuts 61 applied on the projecting ends of the bolts 57. The panel 52 carries grooved flanges 63 on opposite sides of the opening 52 and a bottom stop 65, the flanges and stop serving to slidably receive and support a film cassette or plate holder 67 in position opposite the opening 53. The film holder may be of any suitable or preferred form, providing a seat for a light-sensitive film or plate and a removable cover for enclosing the plate in the seat so that the film may be retained in light tight condition enclosed in the cassette until the same has been mounted in position opposite the opening 53 when, by withdrawing the cover, the film may be uncovered at the opening 53 in position opposite the lens to be exposed.

The box 17 may, of course, be provided with any suitable means for supporting the same in operative position, such means usually comprising brackets 69 fastened thereon approximately opposite the center of gravity of the box, and these brackets may be formed for attachment on any support means on which it may be desired to mount the apparatus.

The utilization of a curved screen 13, in accordance with the teachings of my present invention, does not, to any appreciable degree, distort the image generated thereon as a result of X-ray impingement from the source X, but the use of such a curved screen material notably improves the sharpness of photographic pictures made in the manner herein indicated.

The invention, of course, is not necessarily limited to the photography of fluoroscopic images and, in fact, may have application to the making of pictures, on flat films, of any screened image.

It is thought that the invention and its numerous attendant advantages will be understood from the foregoing description, and it is obvious, of course, that numerous changes may be made in the form, construction, and arrangement of the several parts without departing from the spirit and scope of the invention or sacrificing any of its attendant advantages, the form herein disclosed being a preferred embodiment for the purpose of demonstrating the invention.

The invention is hereby claimed as follows:

1. A camera for the photography of screened images, comprising a light tight housing and support means for mounting light-sensitive photographic material at one end of the housing in position for exposure, a screen comprising a layer of material adapted to fluoresce under the influence of X-rays mounted on said housing in spaced relationship with respect to said support means, and a lens assembly mounted in the housing between said screen and said support means in position to focus light rays emanating from said screen upon light-sensitive material positioned in said support means, said screen having concave curvature facing said lens, the curvature being of such degree that a plurality of remote points therein may be focused by said lens upon corresponding points in the light-sensitive material.

2. A camera as set forth in claim 1, wherein said screen is assembled in a cell secured in light tight fashion at an opening in the end of the housing remote from the support means, said screen comprising a curved panel secured at its marginal edges between co-operating mounting blocks forming a frame, a flanged rim enclosing said frame, and means to secure said rim on said housing with the concave side of the panel facing into the housing and a cover piece secured on said rim in position to enclose the convex surface of said panel in the cell, said cover piece comprising material pervious to X-rays.

3. A camera as set forth in claim 1, wherein said screen comprises a panel secured at its marginal edges in a frame forming a cell adapted for light tight attachment at an opening in the end of the housing remote from said support means, and a cover piece secured on said frame in position to enclose said panel in the cell, said cover piece comprising material pervious to X-rays.

GLENN W. FILES.